E. B. FUQUA.
TRACTOR.
APPLICATION FILED FEB. 17, 1917.

1,245,896.

Patented Nov. 6, 1917.
2 SHEETS—SHEET 1.

WITNESSES

INVENTOR
EDWARD. B. FUQUA,
BY
ATTORNEYS

E. B. FUQUA.
TRACTOR.
APPLICATION FILED FEB. 17, 1917.
1,245,896.
Patented Nov. 6, 1917.
2 SHEETS—SHEET 2.
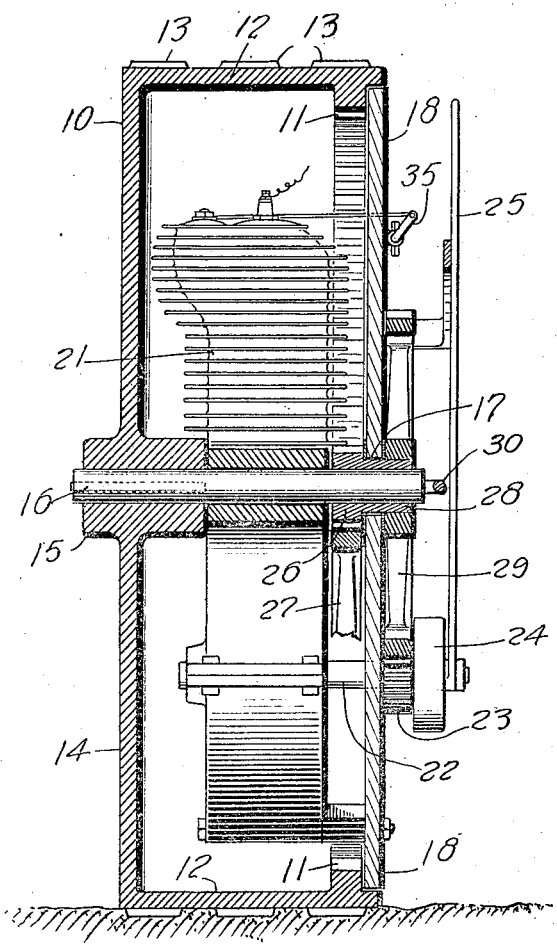
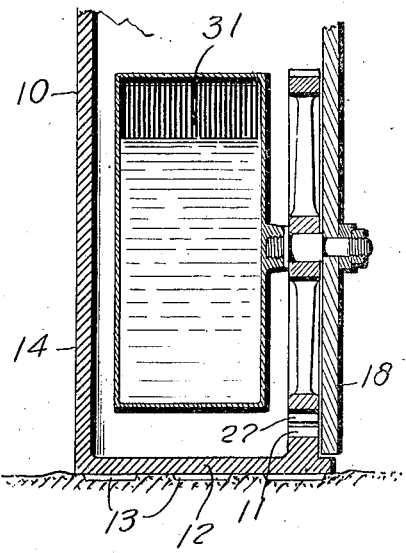
WITNESSES
INVENTOR
EDWARD B. FUQUA,
BY
ATTORNEYS

UNITED STATES PATENT OFFICE.

EDWARD BROWN FUQUA, OF MEMPHIS, TENNESSEE.

TRACTOR.

1,245,896.     Specification of Letters Patent.     Patented Nov. 6, 1917.

Application filed February 17, 1917. Serial No. 149,226.

*To all whom it may concern:*

Be it known that I, EDWARD B. FUQUA, a citizen of the United States, and a resident of Memphis, in the county of Shelby and State of Tennessee, have invented a new and useful Improvement in Tractors, of which the following is a specification.

My invention relates generally to tractors and more particularly to a tractor embodying a single wheel within which the driving mechanism and the majority, at least, of the mechanical parts and connections are housed, one object of my invention, among others, being the provision of a tractor for light work, for which the usual complicated and cumbersome structures could not be used, as well as one which will occupy but a minimum of space in operation as well as in disuse.

Another object of my invention is the provision of a structure capable of turning movement and controlled within minimum space and consequently capable of movement along and adjacent obstructions and the like with respect to which the usual tractor would necessarily have to be given wide clearance.

Another object of my invention is the provision of a simple, comparatively inexpensive structure within the financial reach of farmers and that class generally requiring the use of such an apparatus.

A still further object of my invention is to provide a tractor, the inclosed driving and connecting parts of which are protected from the weather, dirt and other exterior influences at all times.

A still further object of my invention is to provide a tractor which will enable the fullest returns to be obtained for the amount of power expended.

Figure 1:
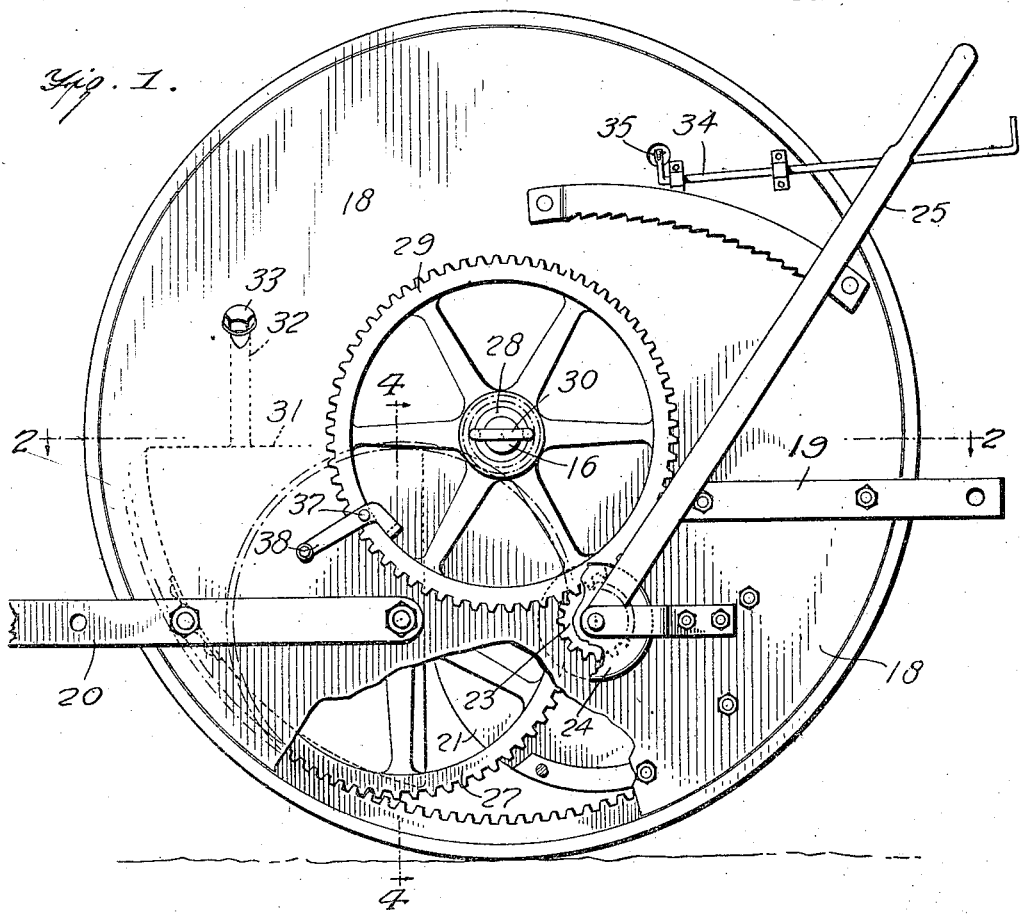
Figure 2:
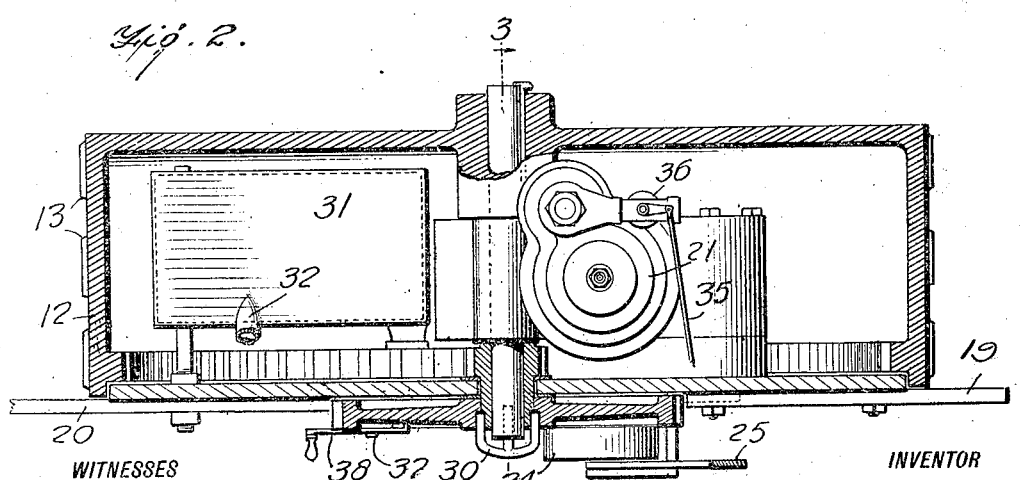

These and other objects relating for the most part to the details of construction of the various parts of the tractor will be better understood from the following description, reference being had to the accompanying drawings, forming a part of this specification, wherein, Figure 1 is a side elevation, parts being broken away, Fig. 2 is a horizontal section taken substantially on the line 2—2 of Fig. 1.

Fig. 3 is a vertical transverse section taken substantially on the line 3—3 of Fig. 2, Fig. 4 is a partial vertical section taken substantially on the line 4—4 of Fig. 1.

Referring now to these figures, and particularly to Fig. 2, my improved tractor includes a single tractor wheel generally indicated at 10, open at one side and provided adjacent its open side with an internal annular gear or rack 11, the annular wall or periphery 12 of the wheel having tractive projections 13 of any suitable nature calculated to assist the firm uniform engagement of the wheel with the traction surface in operation.

The opposite side of the tractor wheel 10 is closed by a side plate 14, centrally of which is a hub 15, and keyed within the hub 15 is one end of an axle 16, the opposite end of which projects beyond the open side of the wheel 10 and through the central bearing 17 of a stationary side plate 18 closing the before-mentioned open side of the wheel 10, with the peripheral edge thereof lapping the rack 11, as seen clearly in Figs. 2 and 3.

The side plate 18 is held in stationary relation by means of beams 19 and 20, as seen in Fig. 1, bolted to its outer surface and projecting beyond the wheel 10, as seen, for connection with the mechanism or part to be moved in the use of the tractor.

In this manner an inclosed space remains within the limits of the wheel 10 in which the several parts of the mechanism as hereinafter described are housed, said parts including an internal combustion engine or prime mover of suitable nature generally indicated at 21, which is bolted to the stationary side plate 18, and the drive shaft 22 of which projects laterally through a bearing in the said plate 11 and is provided with a small gear wheel 23 externally of the side plate 18 and loose on the shaft, connection and disconnection of this gear being controlled by means of a clutch inclosed in a clutch-casing 24 and actuated by means of an upstanding lever 25. In this way the engine may be permitted to operate without effecting rotation of the driving connections to be now described.

Upon the end of the axle 16 adjacent the side wall 18 is mounted a gear wheel 26 in mesh with an intermediate gear 27, the latter of which connects with the rack 11, gears 26 and 27 being internally of the side plate 18 and thus internally of the wheel 10, and the former having a hub portion 28 projecting exteriorly through the central bearing 17 of the side plate 18 to receive an external gear 29 thereon, the latter of which is in engagement with the clutch controlled engine shaft gear 23, as plainly seen by reference to Fig. 1.

The gear 29 last mentioned is loose upon the extending hub 28 of the gear 26 and arranged to be connected thereto by a sliding removable key 30 as best seen in Fig. 2.

In the space within the wheel 10 there may be mounted the oil tanks and other supply means for the engine 21, including a fuel tank 31, the latter of which has a filling spout 32 as seen in dotted lines in Fig. 1, opening through the stationary side plate 18 and normally closed by a screw plug 33. The controlling connections of the engine 21 may be also extended through the side plate 18 including the throttle controlling lever 34, as seen in Fig. 1, with its connections 35 to the carbureter 36.

The gear wheel 29 has a laterally projecting pin 37 as seen in Fig. 1, with which an angular starting crank 38 is engageable so that in operation, with the key 30 removed, and the gear 23 in clutched relation upon the engine shaft 22, the engine may be cranked by rotating the gear 29, after which the clutch is released and the key 30 again placed in position before the clutch is engaged at the start of operations. It is apparent that when the clutch is again thrown in, power will be transmitted through the gears 23, 29, 26 and 27 to the annular internal rack 11 so as to cause rotation of the wheel 10 and cause the tractor to proceed, and it is further apparent that the type of construction of tractor as described provides for a light, strong, durable apparatus of this nature well calculated to effectively and efficiently carry out the objects first above stated.

I claim:—

1. A tractor including a single tractor wheel open at one side and provided with an internal annular rack, a stationary side plate closing the open side of the wheel and completely closing the space within the wheel, a prime mover in the space within the wheel secured to the said stationary side plate, a central axle secured to the wheel and having bearing through said side plate, a drive shaft also having bearing through the said side plate, a clutch controlled gear on the drive shaft externally of the side plate, a pair of connected gears revoluble upon the axle and one of which is in engagement with the said clutch controlled gear, and a gear connecting the other axle gear with the internal rack of the tractor wheel.

2. A tractor including a single tractor wheel open at one side and provided with an internal annular rack, a stationary side plate closing the open side of the wheel and completely closing the space within the wheel, a prime mover in the space within the wheel secured to the said stationary side plate, a central axle secured to the wheel and having bearing through said side plate, a drive shaft also having bearing through the said side plate, a clutch controlled gear on the drive shaft externally of the side plate, a pair of connected gears revoluble upon the axle and one of which is in engagement with the said clutch controlled gear, and a gear connecting the other axle gear with the internal rack of the tractor wheel, said gear connecting with the rack and its respective axle gear being located internally of the stationary side plate, and the other gear of the axle being located externally of the side plate having detachable connection with the first axle gear.

3. A tractor including a single tractor wheel open at one side and provided with an internal annular rack, a stationary side plate closing the open side of the wheel and completely closing the space within the wheel, a prime mover in the space within the wheel secured to the said stationary side plate, a central axle secured to the wheel and having bearing through said side plate, a drive shaft also having bearing through the said side plate, a clutch controlled gear on the drive shaft externally of the side plate, a pair of connected gears revoluble upon the axle and one of which is in engagement with the said clutch controlled gear, and a gear connecting the other axle gear with the internal rack of the tractor wheel, said axle gears being disposed upon respectively opposite sides of the stationary side plate with the outer of the two gears in mesh with the clutch controlled gear, and a sliding and removable key connection between the two gears of the axle, for the purpose described.

4. A tractor including a single tractor wheel open at one side and provided with an internal annular rack, a stationary side plate closing the open side of the wheel and completely closing the space within the wheel, a prime mover in the space within the wheel secured to the said stationary side plate, a central axle secured to the wheel and having bearing through said side plate, a drive shaft also having bearing through the said side plate, a clutch controlled gear on the drive shaft externally of the side plate, a pair of connected gears revoluble upon the axle and one of which is in engagement with the said clutch controlled gear, a gear connecting the other axle gear with the internal rack of the tractor wheel, said axle gears being disposed upon respectively opposite sides of the stationary side plate with the outer of the two gears in mesh with the clutch controlled gear, a sliding and removable key connection between the two gears of the axle, and a starting crank, and a means to engage the outer axle gear, for the purpose described.

EDWARD BROWN FUQUA.

Witnesses:
J. E. HOLMES,
JNO. W. LOCH.